(12) United States Patent
Chen (10) Patent No.: US 8,160,161 B2
(45) Date of Patent: Apr. 17, 2012

(54) METHOD AND APPARATUS FOR PERFORMING MOTION COMPENSATED TEMPORAL FILTERING IN VIDEO ENCODING

(75) Inventor: Jing Yang Chen, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 249 days.

(21) Appl. No.: 12/233,315

(22) Filed: Sep. 18, 2008

(65) Prior Publication Data

US 2009/0016451 A1    Jan. 15, 2009

Related U.S. Application Data

(63) Continuation of application No. 10/929,976, filed on Aug. 30, 2004, now Pat. No. 7,512,182.

(51) Int. Cl.
*H04N 1/58* (2006.01)
*H04N 1/409* (2006.01)
*H04N 5/911* (2006.01)

(52) U.S. Cl. ............................... 375/240.29; 375/240.26

(58) Field of Classification Search ........................ None
See application file for complete search history.

(56) References Cited

U.S. PATENT DOCUMENTS

| | | | |
|---|---|---|---|
| 5,289,283 A | 2/1994 | Hopper et al. | |
| 5,481,308 A | 1/1996 | Hartung et al. | |
| 5,602,591 A | 2/1997 | Saiki | |
| 6,005,626 A | 12/1999 | Ding | |
| 6,037,986 A | 3/2000 | Zhang et al. | |
| 6,178,205 B1 | 1/2001 | Cheung et al. | |
| 6,694,060 B2 | 2/2004 | Liu et al. | |
| 6,731,685 B1 | 5/2004 | Liu et al. | |
| 7,110,455 B2 | 9/2006 | Wu et al. | |
| 7,512,182 B2 * | 3/2009 | Chen | 375/240.29 |
| 7,653,129 B2 | 1/2010 | He et al. | |
| 7,725,202 B2 | 5/2010 | Chen et al. | |
| 2003/0161407 A1 | 8/2003 | Murdock et al. | |
| 2003/0194009 A1 * | 10/2003 | Srinivasan | 375/240.16 |
| 2004/0179610 A1 | 9/2004 | Lu et al. | |
| 2005/0094965 A1 | 5/2005 | Chen et al. | |
| 2007/0081587 A1 * | 4/2007 | Raveendran et al. | 375/240.1 |

OTHER PUBLICATIONS

Office Action, U.S. Appl. No. 10/929,976, May 15, 2008.

* cited by examiner

*Primary Examiner* — Joseph Ustaris
*Assistant Examiner* — David N. Werner
(74) *Attorney, Agent, or Firm* — Stewart M. Wiener (57) ABSTRACT

A method (50) and apparatus (40) for reducing noise in a video signal calculates (53) a discrimination value of a filter based on a magnitude difference between a current frame and a prior frame of a sequence of frames and modifies (54) the current frame using the modified discrimination value. The output of the filter is calculated as follows:

$$g(i,j,k) = f(i,j,k) \pm \beta$$

wherein:
f(i, j, k) is the current frame input to the filter;
g(i, j, k) is the current frame output from the filter; and
β is the discrimination value of the filter, which is calculated as follows:

$$\beta = \begin{cases} \kappa \delta' + \chi, & \delta' = \max\{\delta, \delta_0\}, \quad \delta < \delta_1 \\ 0, & \delta \geq \delta_1 \end{cases}$$

in which:
κ and χ are constants less than one;
δ is a magnitude difference between the current frame and the prior frame; and
$\delta_0$ and $\delta_1$ are constants that satisfy $\delta_0 \leq \delta_1$.

18 Claims, 7 Drawing Sheets

The optimal adaptation scheme along with the maximum strength linear adaptation scheme.

Fig. 1 The optimal adaptation scheme along with the maximum strength linear adaptation scheme.

Fig. 2. The non-linear adaptation scheme and a linear adaptation scheme.

Fig. 3. The optimal adaptation scheme along with a non-linear adaptation scheme.

FIG 4

FIG 6 – Block Diagram of MCTF

FIG 7 – Order of Processing for the Bi-Directional Filtering

METHOD AND APPARATUS FOR PERFORMING MOTION COMPENSATED TEMPORAL FILTERING IN VIDEO ENCODING

FIELD OF THE INVENTION

The present invention relates generally to methods and apparatuses for processing digital information, and more particularly to a method and apparatus for processing digital information prior to transmission over a network.

BACKGROUND

Motion compensated temporal filters (MCTF) are used in pixel processing of video images. MCTF is an adaptive temporal filter along estimated motion trajectories. The temporal correlation is exploited through temporal filtering. MCTF is most effective in processing sequences of images in which signal is highly temporal correlated along the motion trajectories but the noise, by nature, is totally uncorrelated. In other words, the image does not change from frame to frame but the noise does. The noise probability distribution is also exploited. MCTF is primarily used to reduce the zero mean stationary white Gaussian noise. Such noise has a bell shaped distribution, and it is of primarily small magnitude. Large magnitude noise rarely happens. Based on these two observations, the magnitude differences between the current frame and the previous filtered frame are first calculated along the estimated motion trajectories. Small differences are considered primarily of noise. Large differences are considered primarily of signal content.

However, existing MCTFs do not remove all of the noise inherent in a video signal, thereby wasting valuable bandwidth resources.

The present invention is therefore directed to the problem of developing a method and apparatus for performing filtering of noise in a video encoding process that removes as much of the noise as possible without disrupting the video image.

SUMMARY OF THE INVENTION

The present invention solves these and other problems by providing a method and apparatus for filtering noise in a video encoding process, in which an adaptation scheme based on differences between frames is employed, thereby allowing the signal content to pass through while still effectively suppressing the random noise.

According to one aspect of the present invention, a method for filtering noise in a video encoding process determines a discrimination value of a filter based on a magnitude difference between a current frame and a prior frame of a sequence of frames and modifies the current frame using the determined discrimination value.

According to another aspect of the present invention, the current frame may be modified as follows:

$$g(i,j,k) = f(i,j,k) \pm \beta$$

wherein f(i, j, k) is the current frame input to the filter; g(i, j, k) is the current frame output from the filter; and ft is the discrimination value of the filter.

According to still another aspect of the present invention, the discrimination value may be determined as follows:

$$\beta = \begin{cases} \delta - (1/\Delta)\delta^2, & \delta < \Delta \\ 0, & \delta \geq \Delta \end{cases}$$

in which $\delta$ is the magnitude difference between the current frame and the prior filtered frame along the motion trajectories, and $\Delta$ is a predetermined filter strength.

According to yet another aspect of the present invention, the discrimination value may be determined as follows:

$$\beta = \begin{cases} \kappa\delta' + \chi, & \delta' = \max\{\delta, \delta_0\}, \quad \delta < \delta_1 \\ 0, & \delta \geq \delta_1 \end{cases}$$

in which $\kappa$ and $\chi$ are constants less than one; $\delta$ is a magnitude difference between the current frame and the prior filtered frame along the motion trajectories; $\delta_0$ and $\delta_1$ are constants that satisfy $\delta_0 \leq \delta_1$; and $\kappa$, $\chi$, $\delta_0$, and $\delta_1$ can be modified to adjust the filter strength.

According to still another aspect of the present invention, an apparatus for encoding a video signal includes two encoders and a noise reduction preprocessor. The first encoder receives the video signal. The second encoder receives a plurality of parameters from the first encoder to use in encoding the video signal. The noise reduction preprocessor receives pixel data from the first encoder, filters the pixel data by determining a discrimination value of a filter based on a magnitude difference between a current frame and a prior frame of a sequence of frames, and by modifying the current frame using the modified discrimination value, and then provides preprocessed video to the second encoder.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

MCTF is used in a dual-pass video encoder. MCTF is employed between the first pass and second pass encoders. The first pass encoder provides motion vectors, film mode status, scene change decisions, and complexities along with the video data to MCTF. MCTF filters the video data using the motion vectors, film mode status, scene change decisions, and complexities from first pass encoder. MCTF then provides the filtered video data to second pass encoder, which also receives information from first pass encoder.

Figure 4:
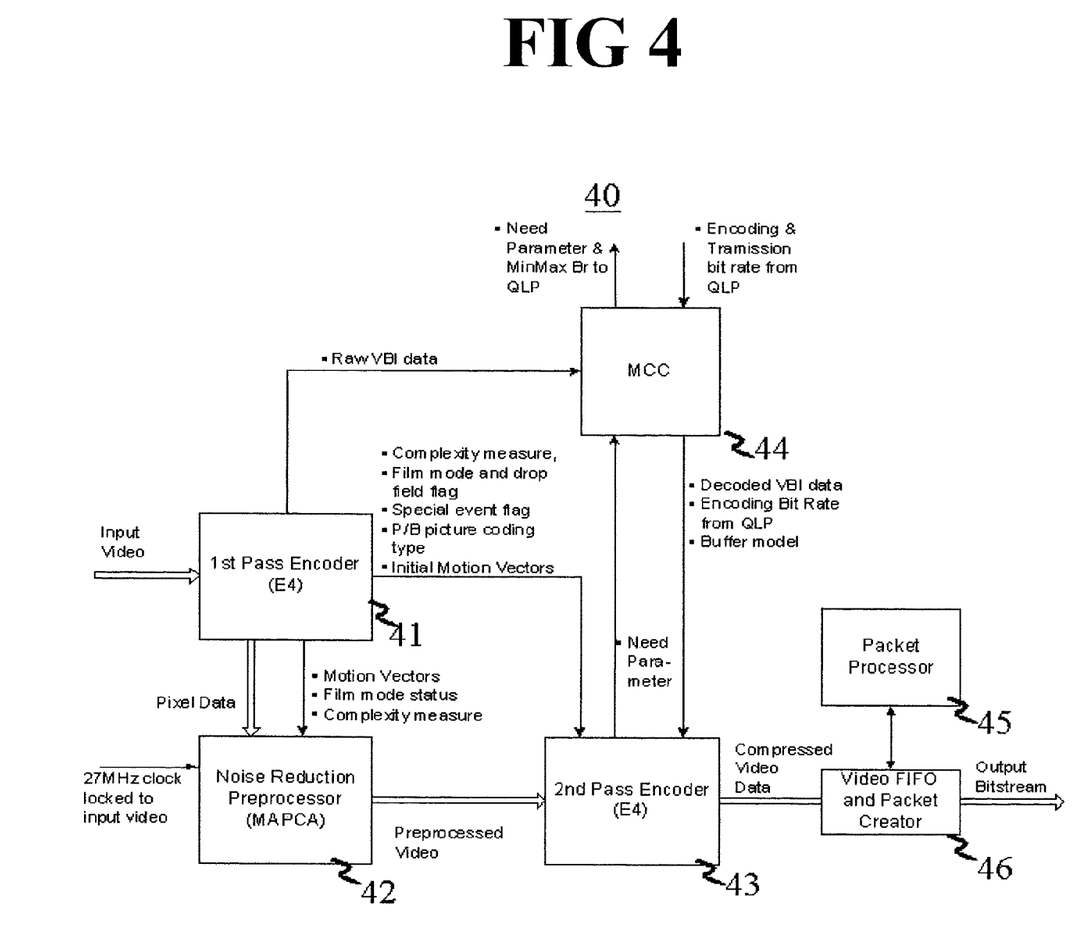
FIG. 4 depicts a block diagram of an exemplary embodiment of a pixel processing system, which employs the MCTF of the present invention according to still another aspect of the present invention.

FIG. 4 shows the block diagram of the overall encoding process for performing MPEG2 encoding. The architecture implements certain video compression features to improve the video quality over current video encoder products, including motion compensated temporal filtering that tracks motion of objects to efficiently remove video noise. There are five major components in the system—a first pass encoder 41, a noise reduction preprocessor 42, a second pass encoder 43, a master compression controller 44 and a packet processor 45. There is also a Video FIFO and Packet Creator 46.

The first pass encoder 41 is a 110 MHz C-Cube DvXpertII (E4) MPEG2 video compression chip. It performs the following functions:

Captures the input CCIR656 (D1) format video;
Captures VBI data;
Horizontal filters and decimates the pixel data in ½, ⅔, or ¾ resolution mode;
Detelecines (inverse 3:2 pulldown);
Detects special events (scene changes);
Trial encodes the video frames to generate complexity measure for the frames; and
Determines P or B picture coding type of a frame.

The noise reduction preprocessor 42 is a 300 MHz Equator MAPCA media processor chip. It performs the following functions:

Lookahead frame delay;
Temporal filtering; and.
Spatial filtering.

The motion compensated temporal filter is an IIR filter. The motion vectors generated by first pass encoding are used to trace motion of objects.

Figure 6:
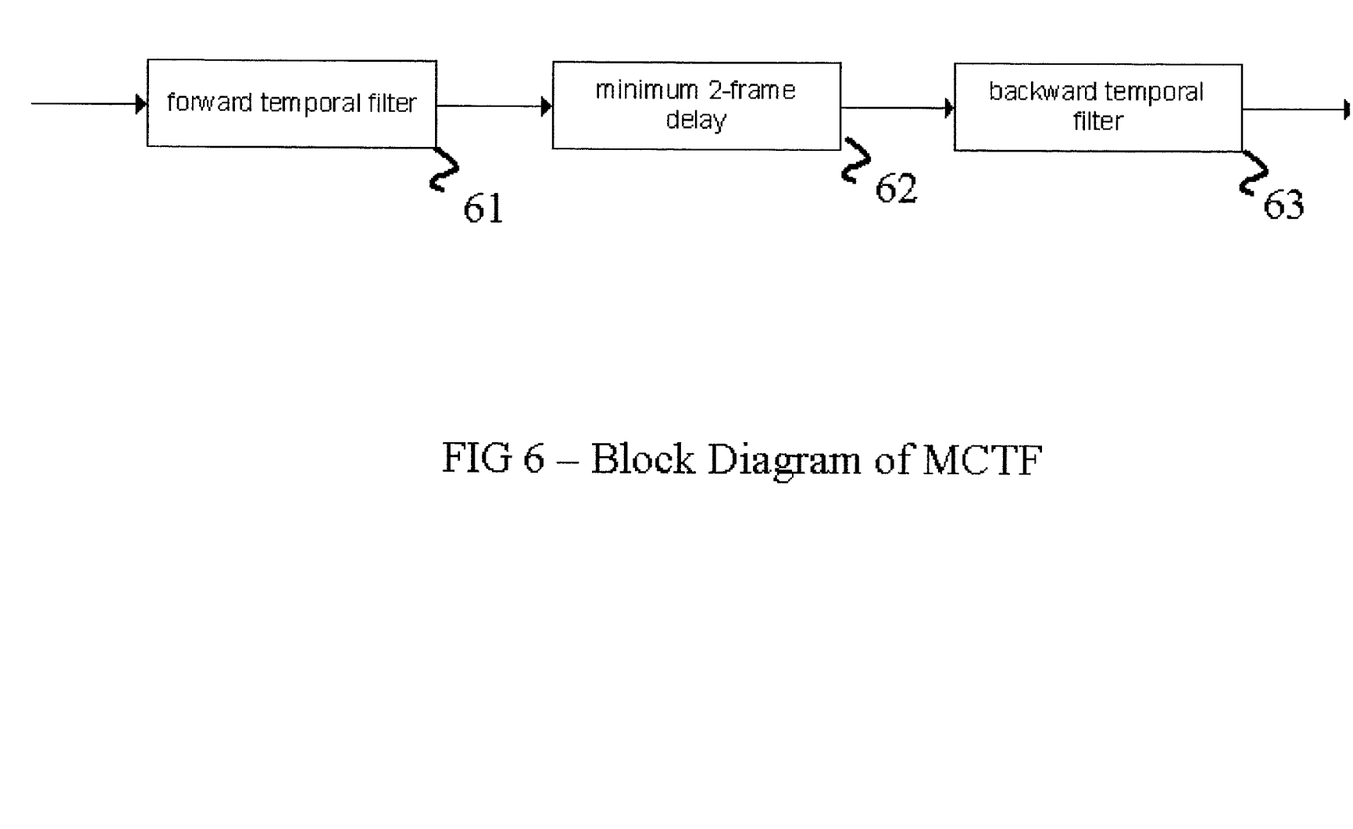
FIG. 6 depicts a block diagram of an exemplary embodiment of a MCTF for filtering images in a video signal according to yet another aspect of the present invention.

FIG. 6 shows the block diagram of the MCTF. The forward temporal filter 61 processes each frame (P and B) in the video sequence using the forward motion vectors from the first pass encoder 41. After a certain delay, the backward temporal filter 63 processes the B frames in the video sequence using the backward motion vectors from the first pass encoder 41. If there are two B frames between two consecutive P frames, minimum two-frame delay is required between the forward 61 and backward 63 temporal filters. The backward temporal filter 63 does not process the P frames in the video sequence.

For P frames, unidirectional temporal filtering is employed, the forward temporal filter generates the following output $g_P(i, j, k)$ for every pixel at indexes $(i, j)$ on $(x, y)$ coordinate and index k on time t axis.

$$g_P(i,j,k) = f_P(i,j,k) \pm \beta$$

where
$f_P(i, j, k)$ is the input pixel of the current P frame at input time k.
$\beta$ is the discrimination value of the filter and it is a function of the absolute difference between $f_P(i,j,k)$ and $g_P(i+d_{(x,f)}, j+d_{(y,f)}, k-M-1)$.

$(d_{(x,f)}, d_{(y,f)})$ is the forward motion vector at $(i, j)$ with half-pel precision. $g_P(i+d_{(x,f)}, j+d_{(y,f)}, k-M-1)$ is the prior filtered P frame along the motion trajectories at input time k−M−1.

M is the number of B frames between the two consecutive P frames.

For B frames, bi-directional temporal filtering is employed, the forward temporal filter generates the following output $g'_B(i, j, k)$ for every pixel at indexes $(i, j)$ on $(x, y)$ coordinate and index k on time t axis.

$$g'_B(i,j,k) = f_B(i,j,k) \pm \beta_1$$

where
$f_B(i, j, k)$ is the input pixel of the current B frame at input time k.

For the first B frame between the two consecutive P frames, $\beta_1$ is the discrimination value of the filter and it is a function of the absolute difference between $f_B(i, j, k)$ and $g_P(i+d_{(x,f)}, j+d_{(y,f)}, k-1)$.

For the second B frame between the two consecutive P frames, $\beta_1$ is the discrimination value of the filter and it is a function of the absolute difference between $f_B(i, j, k)$ and $g_P(i+d_{(x,f)}, j+d_{(y,f)}, k-2)$.

$(d_{(x,f)}, d_{(y,f)})$ is the forward motion vector at $(i, j)$ with half-pel precision. $g_P(i+d_{(x,f)}, j+d_{(y,f)}, k-1)$ or $g_P(i+d_{(x,f)}, j+d_{(y,f)}, k-2)$ is the prior forward temporal filtered P frame along the motion trajectories at input time k−1 or k−2 respectively.

For B frames, the backward temporal filter generates the final output $g_B(i, j, k)$ for every pixel at indexes $(i, j)$ on $(x, y)$ coordinate and index k on time t axis.

$$g_B(i,j,k) = g'_B(i,j,k) \pm \beta_2$$

where
$g'_B(i, j, k)$ is the input pixel to the backward temporal filter of the current B frame at input time k. $g'_B(i, j, k)$ has been previously filtered by the forward temporal filter.

For the first B frame, $\beta_2$ is the discrimination value of the filter and it is a function of the absolute difference between $g'_B(i, j, k)$ and $g_P(i+d_{(x,b)}, j+d_{(y,b)}, k+2)$.

For the second B frame, $\beta_2$ is the discrimination value of the filter and it is a function of the absolute difference between $g'_B(i, j, k)$ and $g_P(i+d_{(x,b)}, j+d_{(y,b)}, k+1)$.

$(d_{(x,b)}, d_{(y,b)})$ is the backward field motion vector at $(i, j)$ with half-pel precision.

$g_P(i+d_{(x,b)}, j+d_{(y,b)}, k+1)$ or $g_P(i+d_{(x,b)}, j+d_{(y,b)}, k+2)$ is the prior forward temporal filtered P frame along the motion trajectories at input time k+1 or k+2 respectively.

It is important to insert a minimum two-frame delay between the forward and backward temporal filters. The two-frame delay allows the forward temporal filter 61 process the P frame at input time k+1 or k+2 prior to the backward temporal filter 63 process the B frame at input time k.

Figure 7:
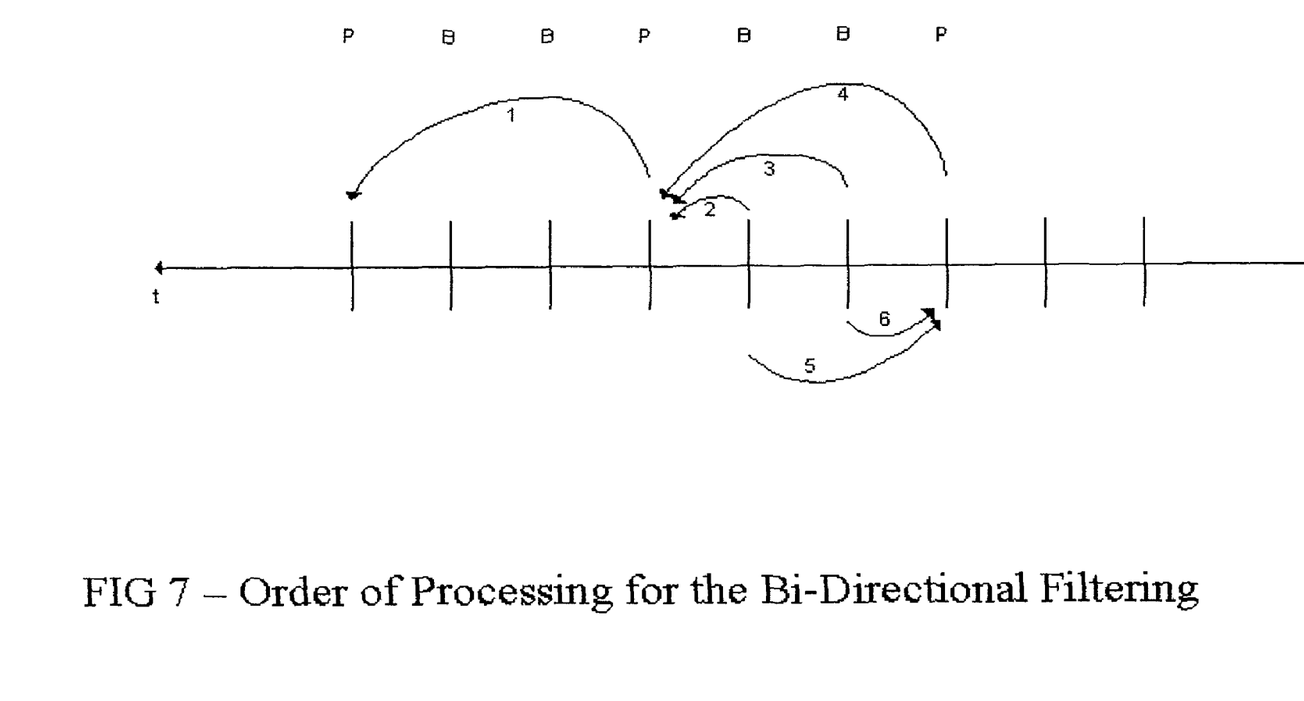
FIG. 7 depicts a plot of a processing order used in a bi-directional MCTF according to yet another aspect of the present invention.

FIG. 7 shows the order of processing for the bi-directional filtering. The forward temporal filter processes each frame (both P and B) in the display order as shown by the arrows 1, 2, 3, and 4. The backward temporal filter processes the B frames in the display order as shown by the arrows 5 and 6. It does not process the P frames.

The second pass encoder 43 is a 110 MHz C-Cube DvXpertII (E4) MPEG2 video compression chip. It performs the following functions:

Refines the motion vectors generated by the first pass encoding;
Calculates need parameters for statmux;
Performs MPEG2 Main Profile at Main Level video encoding;

Rate control; and

Determine if a frame should be coded as I-frame.

The Master Compression Controller (MCC) 44 is a 50 MHz PPC860T PowerPC controller. It performs the following functions.

Communicates with the Controller/Element Manager;

Functions as the host processor for the first pass encoder, second pass encoder and noise reduction preprocessor to perform configuration and status inquiry tasks;

Decodes the VBI data captured on the first pass encoder, delays the VBI decoded VBI data and passes it to the second pass encoder;

Communicates with the QLP to relay need parameter and bit rate messages to the second pass encode; and Maintains the queue of bit rate values received from the QLP for buffer modeling.

The Packet Processor is an 80 MHz DSP56309. It performs the following functions.

Generates PTS and DTS;

Pulls bits out from the video FIFO to create MPEG2 packets at a fixed rate, or at a bit rate specified by the transmission bit rate parameter received from the QLP;

Models the decoder buffer and computes the minimum and maximum transmission bit rate constraints to send to the QLP in statmux; and Performs other MPEG2 system multiplex functions.

According to one aspect of the present invention, half-pel motion compensation is employed in the MCTF to improve the accuracy of the estimated motion trajectories. This increases the signal correlation to allow more noise reduction without trailing or blocking artifacts.

Figure 1:
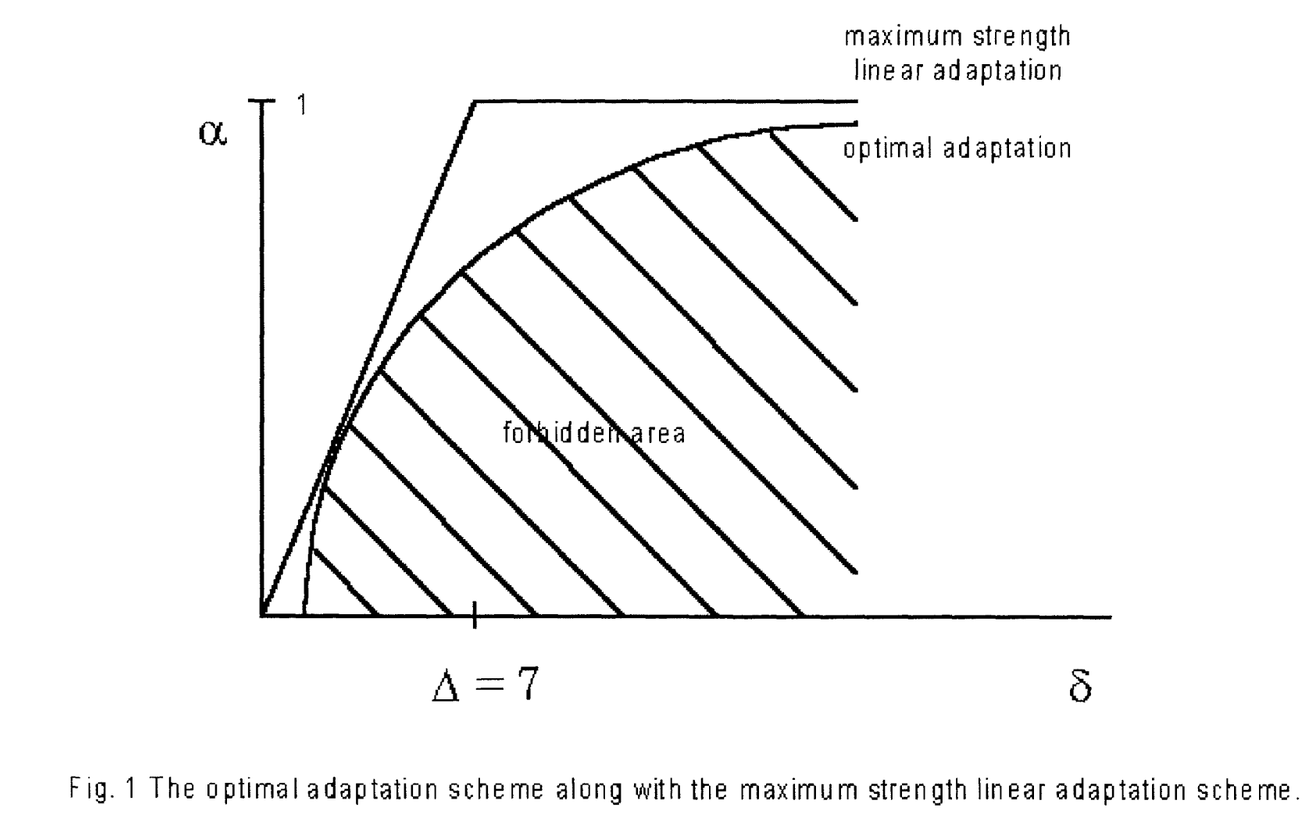
FIG. 1 depicts a plot of a linear adaptive filter used in a Motion Compensation Temporal Filter (MCTF) and the optimal filter according to one aspect of the present invention.

According to another aspect of the present invention, the adaptation scheme of the MCTF is optimized. The optimal adaptation scheme is first determined by experiment. By adjusting the filter continuously at various levels using a series of images with variety of contents, the optimal adaptation area is identified. The "forbidden area" shown in FIG. 1 represents the area in which filtering would degrade the image. The area in white represents the area in which potential noise that may be filtered without adversely affecting the image. The optimal adaptation allows more noise reduction without adversely affecting the signal content. In one version of MCTF, a linear adaptation scheme is employed. Another MCTF is developed, which employs a non-linear adaptation scheme to closely approximate the optimal scheme, and which also reduces the computational complexity if parameters are selected appropriately.

The Optimal Adaptation Scheme

The MCTF is described by the following equation:

$$g(i,j,k)=\alpha f(i,j,k)+(1-\alpha)g(i-d_x,j-d_y,k-1) \quad (1)$$

where $g(i-d_x, j-d_y, k-1)$ is the previous filtered frame; $f(i,j,k)$ and $g(i, j, k)$ are the current input and output frames, respectively; $d_x$ and $d_y$ are the horizontal and vertical motion displacements, respectively; the filter coefficient $\alpha$ adapts to the magnitude difference $\delta$ between $f(i, j, k)$ and $g(i-d_x, j-d_y, k-1)$. The optimal adaptation scheme is established experimentally to allow maximum noise suppression without adversely affecting the video content. The optimal adaptation scheme is shown in FIG. 1 in the $\alpha-\delta$ domain along with the maximum strength linear adaptation scheme. From FIG. 1, we can see the optimal adaptation scheme is a non-linear function which depends on $\delta^\gamma$, where $\gamma<1$. Obviously, the implementation of the optimal adaptation scheme is computationally intensive in the $\alpha-\delta$ domain because of the need to calculate $\delta^\gamma$. Also, any adaptation scheme cannot travel through the shaded area. Otherwise, it will adversely affect the video content.

While computationally intensive, the non-linear adaptation scheme will result in an improvement in noise reduction. Nevertheless, the following exemplary embodiment seeks to obtain this improvement while concomitantly decreasing the computation complexity.

Exemplary Embodiment

An exemplary embodiment of a Motion Compensated Temporal Filter (MCTF) is developed in this section. Let $\delta$ represent the magnitude difference between $f(i, j, k)$ and $g(i-d_x, j-d_y, k-1)$.

$$\delta=|f(i,j,k)-g(i-d_x,j-d_y,k-1)| \text{ or } g(i-d_x,j-d_y,k-1)=f(i,j,k) \pm \delta \quad (2)$$

Substituting equation (2) into equation (1), we obtain:

$$g(i,j,k)=f(i,j,k)\pm(1-\alpha)\delta=f(i,j,k)\pm\beta \quad (3)$$

where $\beta$ represents the discrimination between the filtered and original frames.

$$\beta=(1-\alpha)\delta \quad (4)$$

Equation (3) represents a new implementation of a MCTF, where the discrimination $\beta$ is first calculated. Adding or subtracting $\beta$ from the input, we can then obtain the filter output. If $f(i, j, k)$ is greater then $g(i-d_x, j-d_y, k-1)$, subtraction is performed. Otherwise addition is performed. Comparing equation (3) to equation (1), we can see equation (1) consists of two multiplications while equation (3) consists of only one. Because α is a fixed-point number and the pixel values are 8-bit precision, the multiplications have to be performed with 16-bit precision. Although equation (3) has only one multiplication, the additional computation involved in the decision of whether adding or subtracting $\beta$ from the input cancels out the savings.

Equation (4) translates an adaptation scheme in the original $\alpha-\delta$ domain into the new, $\beta-\delta$ domain. As will be shown, a non-linear adaptation in the $\alpha-\delta$ domain is translated into a linear adaptation in the $\beta-\delta$ domain. This allows a non-linear adaptation in the original domain to be implemented as a linear adaptation in the new domain. This is the fundamental advantage of the exemplary embodiment.

To get more insight into the exemplary embodiment, let us first consider the linear adaptation scheme depicted in FIG. 1. In the linear adaptation scheme, a is a linear function of $\delta$.

$$\alpha = \begin{cases} (1/\Delta)\delta, & \delta < \Delta \\ 0, & \delta \geq \Delta \end{cases} \quad (5)$$

Clearly, the bigger is $\Delta$, the stronger is the filter. Substitute equation (5) into equation (4), we obtain:

$$\beta = \begin{cases} \delta - (1/\Delta)\delta^2, & \delta < \Delta \\ 0, & \delta \geq \Delta \end{cases} \quad (6)$$

Figure 2:
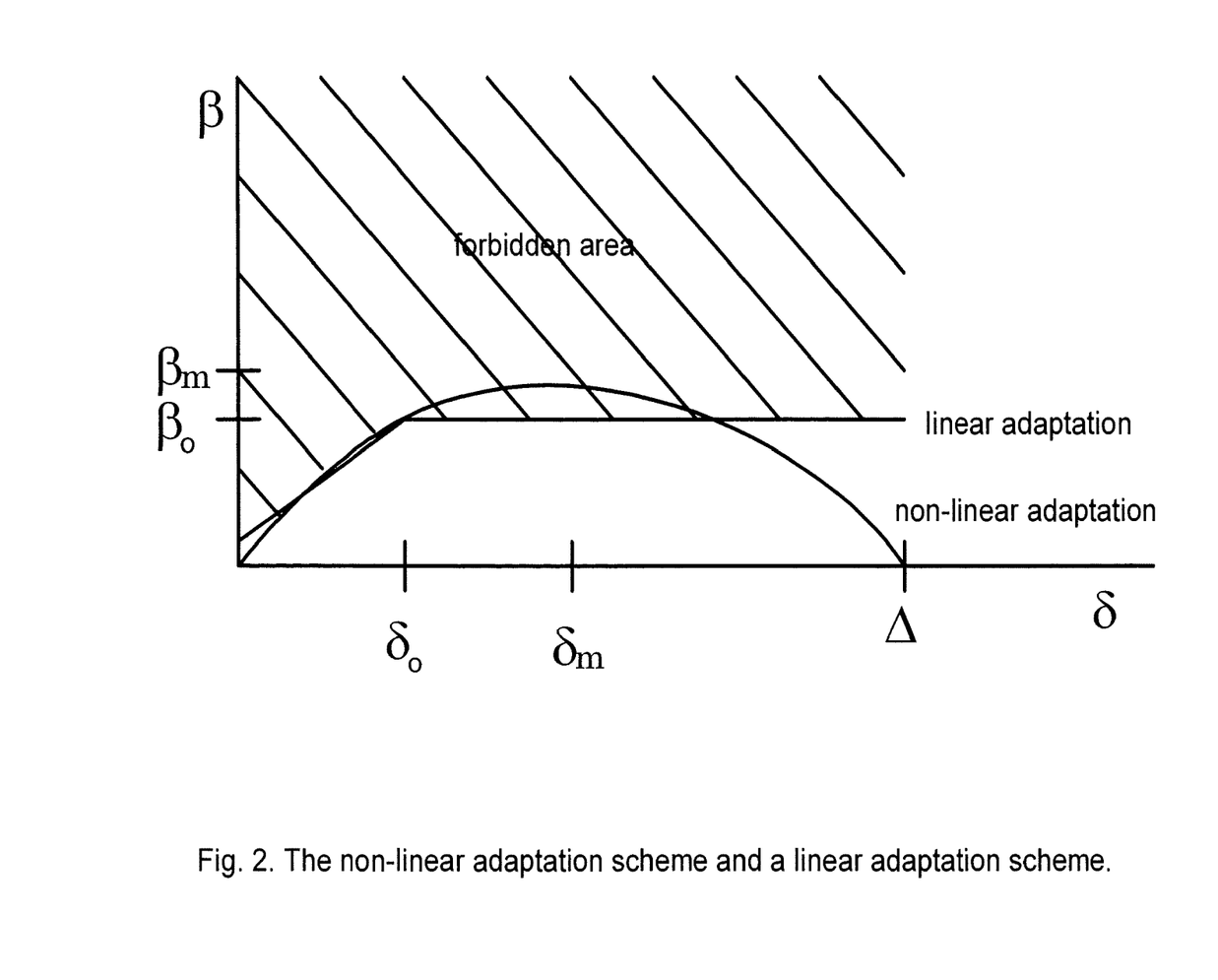
FIG. 2 depicts a mapping of the linear adaptive filter in FIG. 1 to a different domain and a plot of an exemplary embodiment of a MCTF according to another aspect of the present invention.

Equation (6) describes the adaptation scheme in the new $\beta-\delta$ domain. Clearly, it is a non-linear function. In another word, a linear adaptation scheme in the $\alpha-\delta$ domain (original implementation) is translated into a non-linear adaptation scheme in the $\beta-\delta$ domain (exemplary embodiment). This non-linear adaptation scheme in the $\beta-\delta$ domain is shown in FIG. 2 along with a linear adaptation scheme. From equation (6), we can see that $\beta$ attains its maximum value at $\delta_m = (\Delta/2)$.

The maximum value is $\beta_m = (\Delta/4)$. Clearly, to avoid blocking artifacts, we must choose small $\Delta$. This limits the capability of the noise suppression.

In accordance with another aspect of the present invention, a linear adaptation in the $\beta-\delta$ domain can be written as:

$$\beta = \begin{cases} \kappa\delta' + \chi, & \delta' = \max\{\delta, \delta_0\}, \quad \delta < \delta_1 \\ 0, & \delta \geq \delta_1 \end{cases} \quad (7)$$

where $\kappa$ and $\chi$ are constants less than one. Thus, equation (7) represents a linear calculation of the discrimination value for the filter, which discrimination value is then added or subtracted to/from the input frame to obtain the output frame.

In accordance with another aspect of the present invention, $\beta$ should be truncated down to an integer to avoid trailing or blocking artifacts. In general, because the constants $\kappa$ and $\chi$ are fixed numbers, equation (7) has to be implemented with 16-bit precision.

Figure 3:
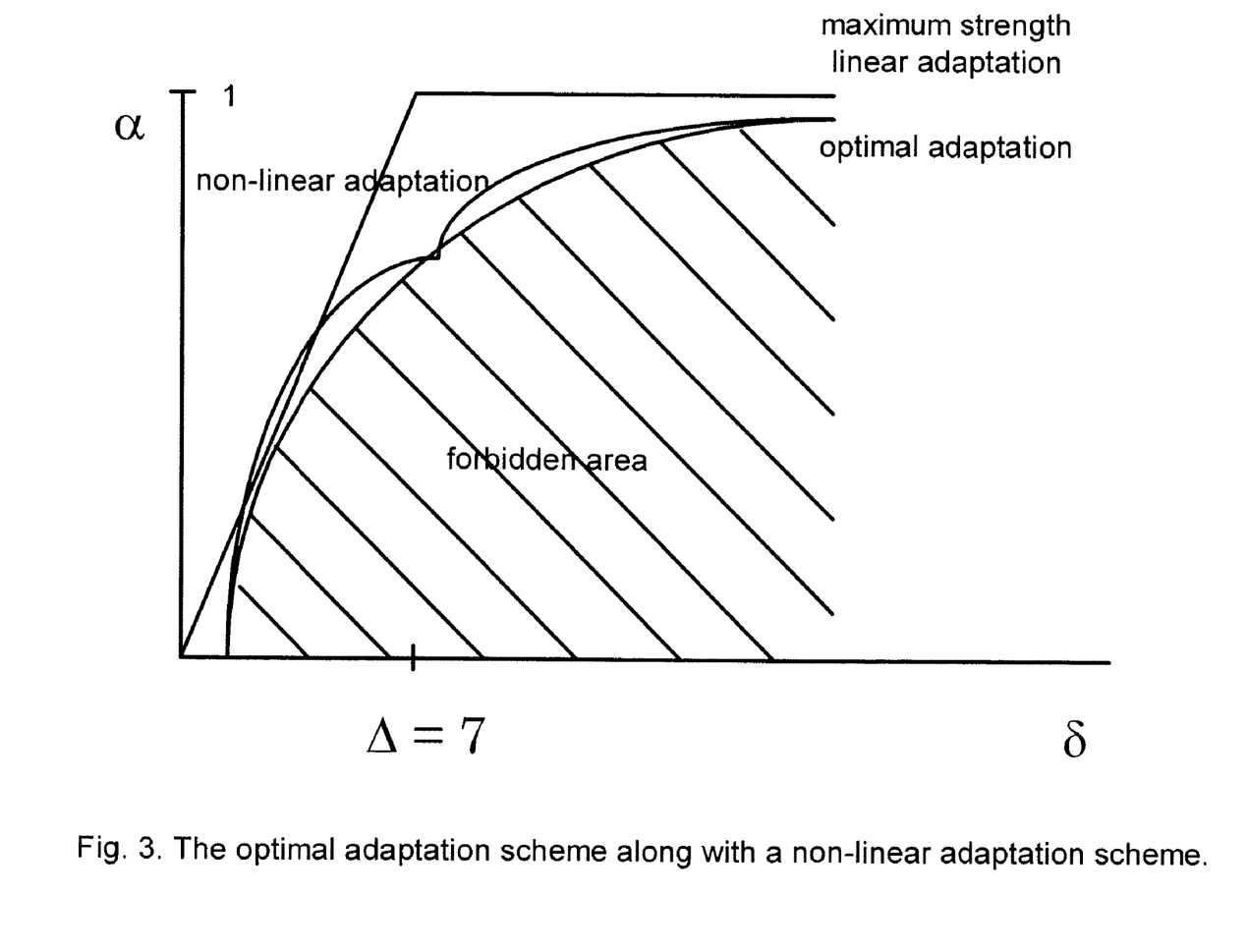
FIG. 3 depicts the exemplary embodiment of FIG. 2 in the original domain along with the linear adaptive filter and the optimal filter.

From equation (4), we can see a linear adaptation in the $\beta-\delta$ domain is translated into a non-linear adaptation in the $\alpha-\delta$ domain. The non-linear adaptation in the $\alpha-\delta$ domain is shown in FIG. 3 along with the optimal adaptation. From FIG. 3, we can see the non-linear adaptation closely approximates the optimal adaptation. Also we can see, the implementation of the non-linear adaptation in the $\alpha-\delta$ domain is rather complex as compared to the implementation of the same adaptation in the $\beta-\delta$ domain, in which the adaptation becomes linear.

In accordance with still another aspect of the present invention, from equation (7), filters with different strength can be implemented by selecting different slopes. This is another advantage over the non-linear adaptation of equation (6). From equation (6), the slope, at $\delta=0$, is actually fixed regardless of the strength of the filter. A stronger filter can be implemented either by increasing the slope or by increasing the maximum discrimination $\beta$. Equation (7) allows us to increase one without changing the other. This allows the adaptation scheme be more manageable.

In accordance with yet another aspect of the present invention, from equation (7), $\kappa$ and $\chi$ are used primarily to adjust the filter strength where $\delta$ is small, while $\delta_0$ and $\delta_1$ are used to adjust the filter strength where $\delta$ is relatively large. $\delta_0$ is also used to adjust the maximum discrimination value to allow as much noise reduction as possible without disrupting the video image. Equation (7) allows us to adjust one aspect of the filter without adversely affecting other aspects of the filter. This allows the adaptation scheme be more manageable.

An example of linear adaptation in the $\beta-\delta$ domain is given as:

$$\beta = \begin{cases} (\delta' + 3)/4, & \delta' = \max\{\delta, 5\}, \quad \delta < 7 \\ 0, & \delta \geq 7 \end{cases} \quad (8)$$

where we choose $\kappa=\frac{1}{4}$, $\chi=\frac{3}{4}$, $\delta_0=5$, and $\delta_1=7$.

From equation (8), we can see, the implementation of the linear adaptation, which maps to a non-linear adaptation in the a-d domain, can be performed with 8-bit precision. In other words, the exemplary embodiment of the non-linear adaptation in the $\alpha-\delta$ domain not only closely approximates the optimal adaptation, but also reduces the computational complexity (note that the division can be implemented by right shifting).

The optimal adaptation scheme is established experimentally to allow maximum noise suppression without adversely affecting the video content. A new implementation of MCTF is developed, which employs non-linear adaptation scheme to closely approximate the optimal scheme. The new implementation also reduces the computational complexity if parameters are selected appropriately.

Figure 5:
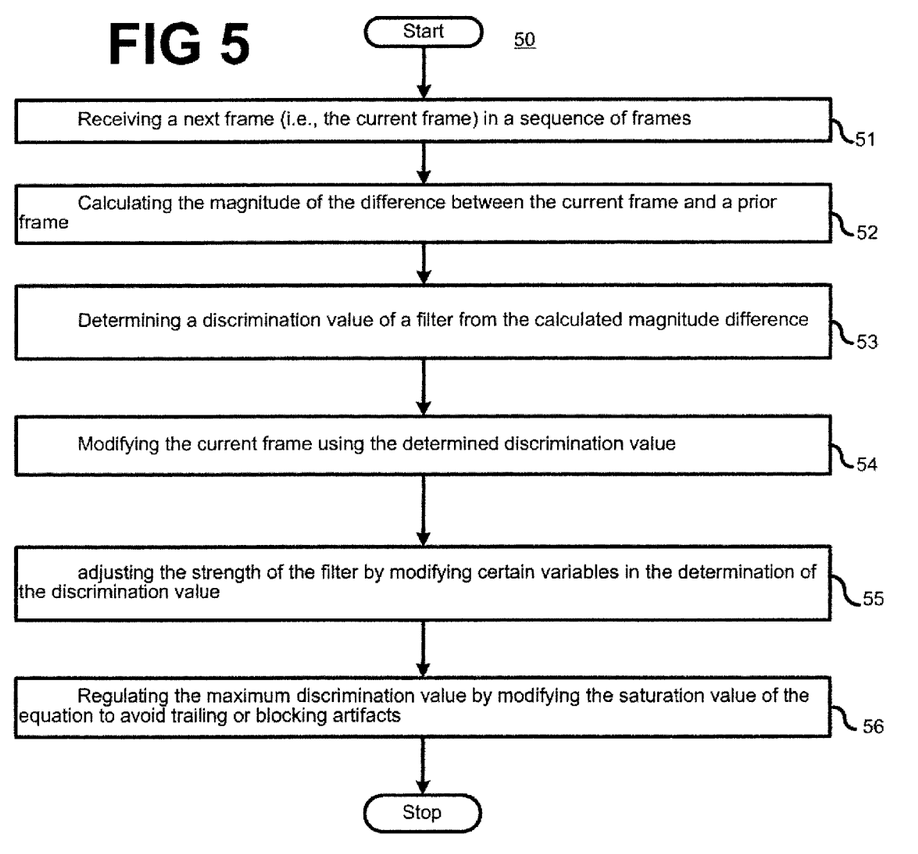
FIG. 5 depicts a flow chart of an exemplary embodiment of a method for filtering images in a video signal according to yet another aspect of the present invention.

Turning to FIG. 5, shown therein is an exemplary embodiment of a method for filtering a video signal according to still another aspect of the present invention.

In element 51, the next frame in the sequence of frames is received by the processor. We shall call this frame the current frame.

In element 52, the magnitude difference between the current frame and a prior filtered frame along the motion trajectories in the sequence of frames is determined.

In element 53, a discrimination value is determined based on the magnitude difference. This discrimination value can be obtained from either equation (6) or equation (7), although equation (7) is considerably easier to implement and manage and it also allows more noise reduction without adversely affecting the video content.

In element 54, the current frame is modified using the discrimination value calculated above. The discrimination value is added to or subtracted from the current frame to obtain the filtered version of the current frame.

As the discrimination value is modified based on the magnitude difference between the current frame and the immediately preceding frame before each frame is "filtered," the discrimination value thereby adapts to the magnitude difference between frames.

In element 55, the strength of the filter is adjusted by modifying certain variables in the determination of the discrimination value. Various techniques can be employed for adjusting the strength of the filter, such as: (1) by modifying the slope of the equation calculating the discrimination value $\beta$ of the filter; (2) by modifying the maximum discrimination $\beta$; (3) in cases in which $\delta$ is small, by modifying the offset of the equation $\chi$; (4) in cases where $\delta$ is small by modifying the slope of the equation $\kappa$; (5) in cases where $\delta$ is relatively large by modifying the cutoff value of the equation $\delta_1$; and (6) in cases where $\delta$ is relatively large by modifying the saturation value of the equation $\delta_0$. These are only some examples of how to adjust the strength of the filter.

In step 56, the maximum discrimination value is regulated by modifying the saturation value of the equation (e.g., $\delta_0$ in some embodiments) to avoid trailing or blocking artifacts.

Although various embodiments are specifically illustrated and described herein, it will be appreciated that modifications and variations of the invention are covered by the above teachings and are within the purview of the appended claims without departing from the spirit and intended scope of the invention. For example, certain filter values are depicted, however, others are possible depending upon the application without departing from the scope of the present invention. Furthermore, these examples should not be interpreted to limit the modifications and variations of the invention covered by the claims but are merely illustrative of possible variations.

What is claimed is:

1. A method for filtering noise in a video encoding process comprising:

determining a discrimination value of a filter based on a magnitude difference between a current frame and a prior frame of a sequence of frames; and modifying the current frame using the determined discrimination value;

wherein the current frame is modified as follows:

$$g(i,j,k) = f(i,j,k) \pm \beta$$

in which:
    f(i, j, k) is the current frame input to the filter;
    g(i, j, k) is the current frame output from the filter; and
    $\beta$ is the discrimination value of the filter;
and wherein the discrimination value is determined as follows:

$$\beta = \begin{cases} \kappa \delta' + \chi, & \delta' = \max\{\delta, \delta_0\}, \quad \delta < \delta_1 \\ 0, & \delta \geq \delta_1 \end{cases}$$

in which:
    $\kappa$ and $\chi$ are constants less than one;
    $\delta$ is a magnitude difference between the current frame and the prior frame; and
    $\delta_0$ and $\delta_1$ are constants that satisfy $\delta_0 \leq \delta_1$.

2. The method according to claim 1, wherein $\kappa = 1/4$.

3. The method according to claim 1, wherein $\chi = 3/4$.

4. The method according to claim 1, wherein $\delta_0 = 5$.

5. The method according to claim 1, wherein $\delta_1 = 7$.

6. The method according to claim 1, wherein $\kappa = 1/4$, $\chi = 3/4$, $\delta_0 = 5$ and $\delta = 7$.

7. The method according to claim 1, wherein if the current frame is greater than the prior frame then subtraction is performed when modifying the current frame, and otherwise addition is performed when modifying the current frame.

8. The method according to claim 1, further comprising: adjusting the strength of the filter where $\delta$ is small by modifying the offset of the equation $\chi$.

9. The method according to claim 1, further comprising: adjusting the strength of the filter where $\delta$ is small by modifying the slope of the equation $\kappa$.

10. The method according to claim 1, further comprising: adjusting the strength of the filter where $\delta$ is relatively large by modifying the cutoff value of the equation $\delta_1$.

11. The method according to claim 1, further comprising: adjusting the strength of the filter where $\delta$ is relatively large by modifying the saturation value of the equation $\delta_0$.

12. The method according to claim 1, further comprising: regulating the maximum discrimination value by modifying the saturation value of the equation ($\delta_0$) to avoid trailing or blocking artifacts.

13. An apparatus for encoding a video signal comprising:
a first encoder receiving the video signal;
a second encoder receiving a plurality of parameters from the first encoder to use in encoding the video signal; and
a noise reduction preprocessor:
    receiving pixel data from the first encoder;
    filtering the pixel data;
    determining a discrimination value of a filter based on a magnitude difference between a current frame and a prior frame of a sequence of frames;
    modifying the current frame using the modified discrimination value; and
    providing preprocessed video to the second encoder;
wherein the noise reduction preprocessor modifies the current frame as follows:

$$g(i,j,k) = f(i,j,k) \pm \beta$$

in which:
    f(i, j, k) is the current frame input to the filter;
    g(i, j, k) is the current frame output from the filter; and
    $\beta$ is the discrimination value of the filter;
and wherein the noise reduction preprocessor determines the discrimination value as follows:

$$\beta = \begin{cases} \kappa \delta' + \chi, & \delta' = \max\{\delta, \delta_0\}, \quad \delta < \delta_1 \\ 0, & \delta \geq \delta_1 \end{cases}$$

in which:
    $\kappa$ and $\chi$ are constants less than one;
    $\delta$ is a magnitude difference between the current frame and the prior frame; and
    $\delta_0$ and $\delta_1$ are constants that satisfy $\delta_0 \leq \delta_1$.

14. The apparatus according to claim 13, wherein $\kappa = 1/4$, $\chi = 3/4$, $\delta_0 = 5$, and $\delta_1 = 7$.

15. The apparatus according to claim 13, wherein if the current frame is greater than the prior frame then the noise reduction preprocessor performs subtraction when modifying the current frame using the discrimination value, and otherwise the noise reduction preprocessor performs addition when modifying the current frame using the discrimination value.

16. The apparatus according to claim 13, wherein the noise reduction preprocessor truncates the discrimination value to an integer prior to modifying the current frame using the discrimination value.

17. An apparatus for reducing noise in a video signal comprising a processor:
    determining a discrimination value of a filter based on a magnitude difference between a current frame and a prior frame of a sequence of frames; and
    modifying the current frame using the modified discrimination value as follows:

$$g(i,j,k) = f(i,j,k) \pm \beta$$

wherein:
f(i, j, k) is the current frame input to the filter;
g(i, j, k) is the current frame output from the filter; and
$\beta$ is the discrimination value of the filter, which is determined as follows:

$$\beta = \begin{cases} \kappa \delta' + \chi, & \delta' = \max\{\delta, \delta_0\}, \quad \delta < \delta_1 \\ 0, & \delta \geq \delta_1 \end{cases}$$

in which:
    $\kappa$ and $\chi$ are constants less than one;
    $\delta$ is a magnitude difference between the current frame and the prior frame; and
    $\delta_0$ and $\delta_1$ are constants that satisfy $\delta_0 \leq \delta_1$.

18. A method for adapting a motion compensated temporal filter to a magnitude difference between successive frames of a video signal comprising:
    receiving a next frame in a sequence of frames;
    determining a magnitude difference between the next frame and a prior frame in the sequence of frames;
    determining a discrimination value based on the magnitude difference; and
    modifying the next frame using the calculated discrimination value, wherein said modifying comprises modifying the next frame using the discrimination value as follows:

$$g(i,j,k) = f(i,j,k) \pm \beta$$

wherein:
f(i, j, k) is the next frame input to the filter;

g(i, j, k) is the next frame output from the filter; and
β is the discrimination value of the filter, which is determined as follows:

$$\beta = \begin{cases} \kappa \delta' + \chi, & \delta' = \max\{\delta, \delta_0\}, \quad \delta < \delta_1 \\ 0, & \delta \geq \delta_1 \end{cases}$$

in which:

κ and χ are constants less than one;

δ is a magnitude difference between the next frame and the prior frame; and $\delta_0$ and $\delta_1$ are constants that satisfy $\delta_0 \leqq \delta_1$.

* * * * *